United States Patent
Kaitha

(10) Patent No.: US 10,496,532 B1
(45) Date of Patent: Dec. 3, 2019

(54) AUTOMATICALLY RECONFIGURING A PERFORMANCE TEST ENVIRONMENT

(71) Applicant: Capital One Services, LLC, McLean, VA (US)

(72) Inventor: Sunil Kaitha, McLean, VA (US)

(73) Assignee: Capital One Services, LLC, McLean, VA (US)

(*) Notice: Subject to any disclaimer, the term of this patent is extended or adjusted under 35 U.S.C. 154(b) by 0 days.

(21) Appl. No.: 16/540,794

(22) Filed: Aug. 14, 2019

(51) Int. Cl.
*G06F 11/36* (2006.01)

(52) U.S. Cl.
CPC ...... *G06F 11/3696* (2013.01); *G06F 11/3664* (2013.01); *G06F 11/3688* (2013.01)

(58) Field of Classification Search
CPC .................................. G06F 11/3664–3696
USPC ....... 714/38.1, 47.1; 717/124, 126, 131, 168
See application file for complete search history.

(56) References Cited

U.S. PATENT DOCUMENTS

| | | | |
|---|---|---|---|
| 9,043,788 B2 * | 5/2015 | Garrett | G06F 11/3414 718/1 |
| 10,042,697 B2 | 8/2018 | Ahad | |
| 10,142,204 B2 | 11/2018 | Nickolov et al. | |
| 2013/0080760 A1 * | 3/2013 | Li | G06F 11/3409 713/100 |
| 2018/0068250 A1 * | 3/2018 | Conti | G06Q 10/06393 |
| 2018/0114234 A1 | 4/2018 | Fighel | |
| 2018/0373617 A1 | 12/2018 | Gaier et al. | |
| 2019/0050319 A1 | 2/2019 | Gondalia et al. | |
| 2019/0108001 A1 * | 4/2019 | Hauser | G06F 8/30 |
| 2019/0294528 A1 * | 9/2019 | Avisror | G06F 8/65 |

* cited by examiner

*Primary Examiner* — Joseph R Kudirka
(74) *Attorney, Agent, or Firm* — Sterne, Kessler, Goldstein & Fox P.L.L.C.

(57) ABSTRACT

Described herein is a system for automatically reconfiguring a test environment. As described above, performance testing can be time-consuming and error-prone resulting in the use of unnecessary computational resources. The system may use machine-learning to determine whether the test environment, test data, and/or test script is to be reconfigured to optimize the performance test. The system may iteratively reconfigure the test environment, test data, and/or test script, and re-execute the performance test, until an optimal performance test of an application is executed based on a specified performance requirement.

20 Claims, 7 Drawing Sheets

US 10,496,532 B1

AUTOMATICALLY RECONFIGURING A PERFORMANCE TEST ENVIRONMENT

BACKGROUND

An application may be a software program on a computing device or distributed across multiple computing devices across a network. Performance tests may determine the speed, responsiveness or stability of an application when a workload is applied to the application. Performance tests may be completed by executing manual or automated test scripts on an application. The test scripts may include test cases. Test cases may be example tasks to be completed by the software in various situations with various types of data. The performance test may have certain desirable performance requirements for executing the test cases. For example, a test case may include calls to an API which returns a result. The desired performance requirement may be that the API returns the result within 1 ms. The performance test may track the amount of time the API took to return the result.

Performance testing of different software applications is important to determine the durability, reliability, and efficiency of the software application being tested. A software application may be executed in various situations in the real-world. Performance testing provides insight into how the software application handles real-world situations such as processing large amounts of data, software application deals with exception handling, system outages, bad data, and/or the like. Results of a performance test may provide an understanding of whether the software application is ready for the production (i.e., real-world) environment, or whether further tweaks to the software application or production environment are needed.

Performance testing may be an iterative process, requiring manual configuration of test data and environments to ultimately identify an environment that can execute the application in a manner that satisfies the performance requirement. In this regard, incorrect configurations may be tested, which use unnecessary computational resources. In addition, performance testing may require a lot of manual work of spinning up test environments with different infrastructures. Not only is configuring test environments time consuming, creation of test data can also be time-consuming. Thus, analyzing the test results and identifying the right configurations for production deployments may be a time consuming and error-prone task.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Described herein is a system for automatically reconfiguring a test environment. As described above, performance testing can be a time-consuming and error-prone resulting in the use of unnecessary computational resources. The system may execute a performance test of an application in a test environment, monitor the results of the test, reconfigure the test environment, test data, and/or test script to optimize the performance test, and re-execute the performance test of the application in an updated test environment, test data, and/or test script to optimize the performance test. The system may use machine-learning to determine whether the test environment, test data, and/or test script is to be reconfigured to optimize the performance test. For example, the system determines the test data and/or test script is no longer valid based on the results of the performance test. The system may modify the test data and/or test script so that the performance test may be executed using valid test data and test scripts. The system may iteratively reconfigure the test environment, test data, and/or test script, and re-execute the performance test, until an optimal performance test of an application is executed based on a specified performance requirement.

In this regard, the system disclosed herein can spin up the test infrastructure when needed to accommodate testing requirements and is also capable of shutting down the infrastructure after the testing process completed to save the infrastructure cost. Furthermore, by using machine learning algorithms able to identify infrastructure issues (i.e., configuration issues) and automatically re-executing tests saves time and computational resources.

The system may execute the tests with various combinations of test data as well as make changes to infrastructure/application configurations to identify the right configurations for production deployments. Furthermore, the system for automatically reconfiguring a test environment may provide real-time monitoring capability allows so that the progress of the performance test may be monitored. Monitoring also provides visibility to see test data details and application environment configuration details.

The system may also store and retrieve data regarding past performance tests and configurations and use the data regarding past performance tests and configurations to reconfigure test environment, test data, and/or test script.

Figure 1:
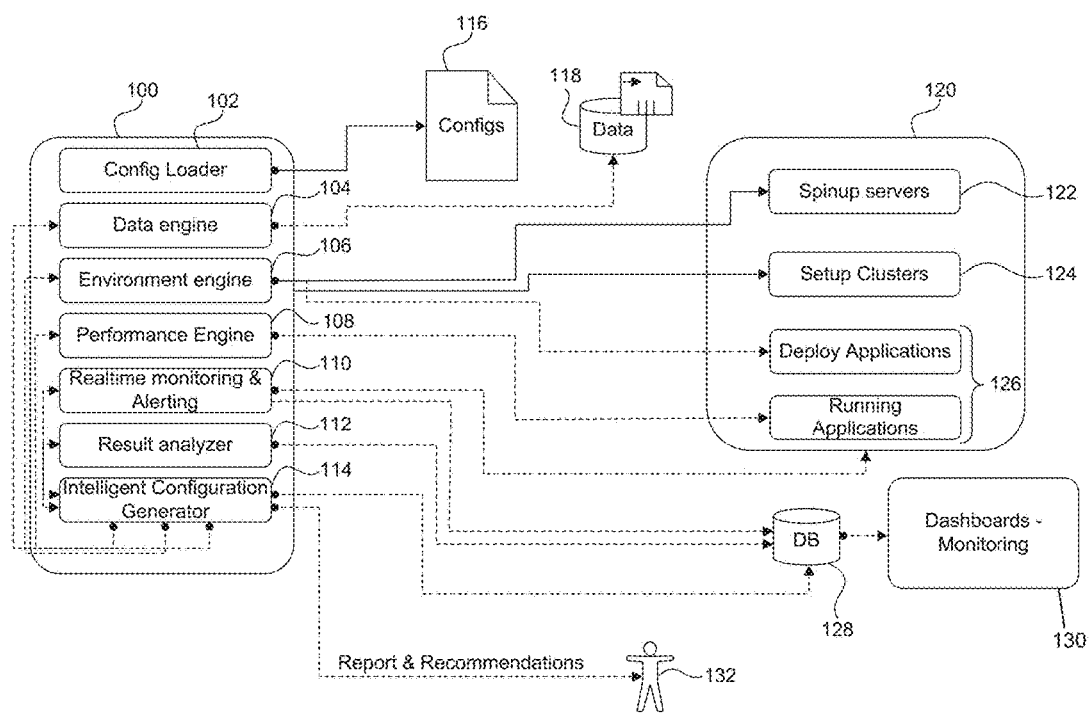
FIG. 1 is a block diagram of the system for automatically reconfiguring a test environment according to an embodiment.

FIG. 1 is a block diagram of a system for automatically reconfiguring a test environment. The system for automatically reconfiguring a test environment may include a test system 100. The test system 100 may include a configuration loader 102, a data engine 104, an environment engine 106, a performance engine 108, a monitoring engine 110, a results engine 112, and an intelligent configuration generator 114. The system may further include a configuration repository 116 and a test data repository 118. The system may further include a test environment including servers 122, computing clusters 124, and applications 126. The system may further include a database 128, dashboards 130, and a user device 132.

In an embodiment, test system 100 receives a request to execute a performance test on an application. Performance tests may determine the speed, responsiveness and stability of a computer, network, software program or device under a workload. Performance testing may be executed in a production or test environment. Types of performance testing may include but are not limited to: load testing, stress testing, soak testing, spike testing, breakpoint testing, configuration testing, isolation testing, internet testing, and/or the like. Performance tests may monitor whether an application is meeting specified performance requirements. The performance requirements may be related to concurrency and throughput, server response time, render response time, performance specifications, and/or the like.

The request received by test system 100 may include a specified configuration and specified test data. Configuration loader 102 may retrieve the specified configuration from the configuration repository 116. The specified configuration may include specified set of servers 122, computing clusters 124, and applications 126. In an embodiment, the specified configuration may also include data repositories (not shown). Data engine 104 may retrieve the specified test data from test data repository 118. Data engine 104 may also retrieve the test script for executing the performance test. A test script is a set of instructions performed to execute a specified test, to verify the application performs as expected. A test script may include multiple different test cases. Test cases are specified inputs, execution conditions, and testing procedures. In this case, the specified test is a performance test of an application.

Environment engine 106 may set up test environment 120 to include the specified set of servers 122, computing clusters 124, and application 126, based on the retrieved configuration. For example, to set up the test environment, environment engine 106 provisions computing resources in a cloud computing environment. The computing resources include servers 122, computing clusters 124, and application 126. The computing resources may also include data repositories, computing services, and/or the like. Provisioning computing resources in a cloud computing environment includes allocating the computing resources based on the retrieved configuration. Environment engine 106 may use advanced provisioning, dynamic provisioning, and user self-provisioning to provision the computing resources. In another embodiment, to set up the test environment, the environment engine 106 may transmit instructions to servers 122, computing clusters, and application 126 in a distributed computing environment.

Performance engine 108 may execute the test script in the test environment 120 using the test data. Performance engine 108 may execute the servers, computing clusters, and applications as governed by the test script. As described above, test scripts may include multiple different test cases. Each test case may include tasks to be completed by the application. The tasks may include calls to the API, queries, calculations, and/or the like. A test script may instruct the software application to use the specified servers, computing clusters, or applications to execute the calls to the API, queries, or calculations. Execution of each test case may produce a result. The result may include a return value from the software application, time consumed by the software application while performing a task, memory utilized by the software application while performing a task, CPU power utilized by the software application while performing a task, and/or the like.

Monitoring engine 110 may monitor the servers, computing clusters, and application as the test script is executed. Monitoring engine 110 may collect data regarding the servers, computing clusters, and application. The data may include but is not limited to, response time, load data, CPU utilization, memory utilization, disk utilization, network utilization, and/or the like. Monitoring engine 110 may feed the collected data to intelligent configuration generator 114.

Results engine 112 may analyze a result of the executing the test script. The result may be a combination of all of the results of executing the test cases. Results engine 112 may generate a score indicating whether the performance test of the application met a performance requirement based on the result of executing the test script. In an embodiment, the score may be a ratio of the requirements that were met. In one example, a test of an API may have three performance requirements representing a required speed to respond to three different API calls. If two of the three performance requirements are met the score may be 0.66. Results engine 112 may provide the score to intelligent configuration generator 114.

Intelligent configuration generator 114 may determine whether the performance test of the application can be further optimized based on the score generated by results engine 112 and data collected by monitoring engine 110. For example, intelligent configuration generator 114 may be trained using data collected by monitoring engine 110 and the score generated by results engine 112 to determine whether the performance test of the application can be further optimized. Intelligent configuration generator 114 may also use past performance tests that have been executed to determine whether the performance test of the application can be further optimized. Optimization may include updating the configuration of the test environment. Updating the configuration of the test environment may include changing the specified set of servers 122, computing clusters 124, and applications 126.

In an embodiment, optimization may also include changing and/or modifying the test data. For example, intelligent configuration generator a performance test has an unsatisfactory result because the test data used to execute the performance test is invalid. Intelligent configuration generator 114 may extract any errors occurred during the performance test that caused the unsatisfactory result. Intelligent configuration generator 114 may determine the errors occurred due to invalid data. Intelligent configuration generator 114 may modify the test data based on past execution of performance tests and feedback provided by a user. Intelligent configuration generator 114 stores the modified test data in a local memory such as a buffer or cache. Intelligent configuration generator 114 may instruct environment engine 106 to set-up the test environment based on the updated configuration. Intelligent configuration generator 114 may instruct performance engine 108 to re-execute the performance test in the updated test environment using the modified or different test data. Test system 100 may re-execute the performance test of the application with modified/different test data and/or configurations until intelligent configuration generator determines the performance test is optimal.

For example, intelligent configuration generator 114 may determine the performance test of an application after n iterations is now successful after modifying the configuration and/or test data n times. Each time intelligent configuration generator 114 re-executes the performance test with a modified configuration and/or test data, and the performance test produces an unsatisfactory result, intelligent configuration generator 114 may determine that either the modifications made to the configuration and/or test data were not correct. Additionally, once a performance test is executed which intelligent configuration generator 114 determines to produce a satisfactory result, intelligent rule generator may provide a recommendation to user device 132 to update the test data stored in test data repository 118 with the modified test data which was used in the successful performance test of the application. User device 132 may provide feedback whether to update the test data in the test data repository with the modified test data. In response to receiving confirmation to update the test data in the test data repository with the modified test data intelligent configuration generator 114 can update the test data in the test data repository with the modified test data in test data repository 118. In this regard, intelligent configuration generator 114 may be trained to identify invalid test data and modify the test data for the performance test using reinforcement training, based on successful or unsuccessful results of the performance tests and feedback provided by user device 132.

As a non-limiting example, test system 100 may receive a request to execute a performance test of an application configured to process electronic payments using payment cards such as credit cards or debit cards. The test data retrieved from the test repository may include test payment card information. The payment card information may include test payment card number, card holder name, billing address, security code, expiration date, and/or the like. The payment card information may have not been updated and the expiration date of the payment cards may have already passed. Consequently, when executing the test script each test case of the test script will fail as the payment card will be unable to make electronic payments due to the past expiration date of the payment card. Each executed test case may generate an error message indicting the past expiration date of the payment card. Intelligent rule generator 114 may determine the test data is invalid as the expiration dates of the payment cards are in the past. Intelligent rule generator 114 may update the expiration dates of the payment cards to make the expiration dates valid dates. Intelligent rule generator 114 may store the updated test data with the correct expiration dates in local memory within test system 100. Intelligent rule generator 114 may instruct performance engine 108 to re-execute the performance test with the updated test data. Performance engine 108 may re-execute the performance test with the updated test data. The performance test may generate more satisfactory results as the expiration dates of the payment cards have been updated. Based on the satisfactory results, intelligent rule generator 114 may present the updated test data to user device 132. User device 132 may provide feedback whether to store the updated test data in test data repository 118, replacing the old test data. In response to receiving confirmation from user device 132, intelligent rule generator 114 may store the updated test data in test data repository 118, replacing the old test data.

To adapt the training data, intelligent configuration generator 114 may use a variety of different reinforcement techniques. For example, criterion of optimality, brute force, value function, direct policy search, deep reinforcement learning, inverse reinforcement learning, apprenticeship learning, Q-learning, state-action-reward-state-action (SARSA), deep Q network, deep deterministic policy gradient, asynchronous advantage actor-critic algorithm, Q-learning with normalized advantage functions, trust region policy optimization, proximal policy optimization, and/or the like.

In an embodiment, intelligent configuration generator 114 may optimize the performance test using a hill climbing algorithm. Hill climbing is a mathematical optimization technique. The hill climbing algorithm is an iterative algorithm that incrementally changes values to make a change to the solution. In this regard, the hill climbing algorithm can be used to iteratively change test data, test scripts, and/or configurations until the performance test of the application is optimized. It can be appreciated that intelligent configuration generator 114 may use different algorithms for optimizing the performance test of the application.

In an embodiment, results engine 112 and/or intelligent rule generator 114 may store the score modified/different test data, test scripts, and/or configurations in a database. Intelligent configuration generator 114 may generate a report at the completion of each iteration of the performance test. Alternatively, intelligent configuration generator 114 may generate a report once an optimal performance test is completed. Intelligent rule generator 114 may store the report in database 128. The report may indicate the score and the modified/different test data and/or configurations. Intelligent rule generator 114 may transmit the report to user device 132. In an embodiment, intelligent rule generator 114 may provide user device 132 with recommendations regarding an ideal configuration for executing the application based on the optimal performance test. For example, the recommendation may indicate the ideal amount of computing power and memory required for executing application. User device 132 may provide feedback to the ideal configurations or modified test data and based on the feedback intelligent rule generator 114 may be trained to identify valid test data and configurations for executing performance tests. In an embodiment, a dashboard reflecting the results of each iteration of the performance test may be presented on user device 132. In an embodiment, user device 132 may monitor the results of the performance test in real-time as the test script is executed. The user device 132 may provide feedback during the performance test.

Figure 2:
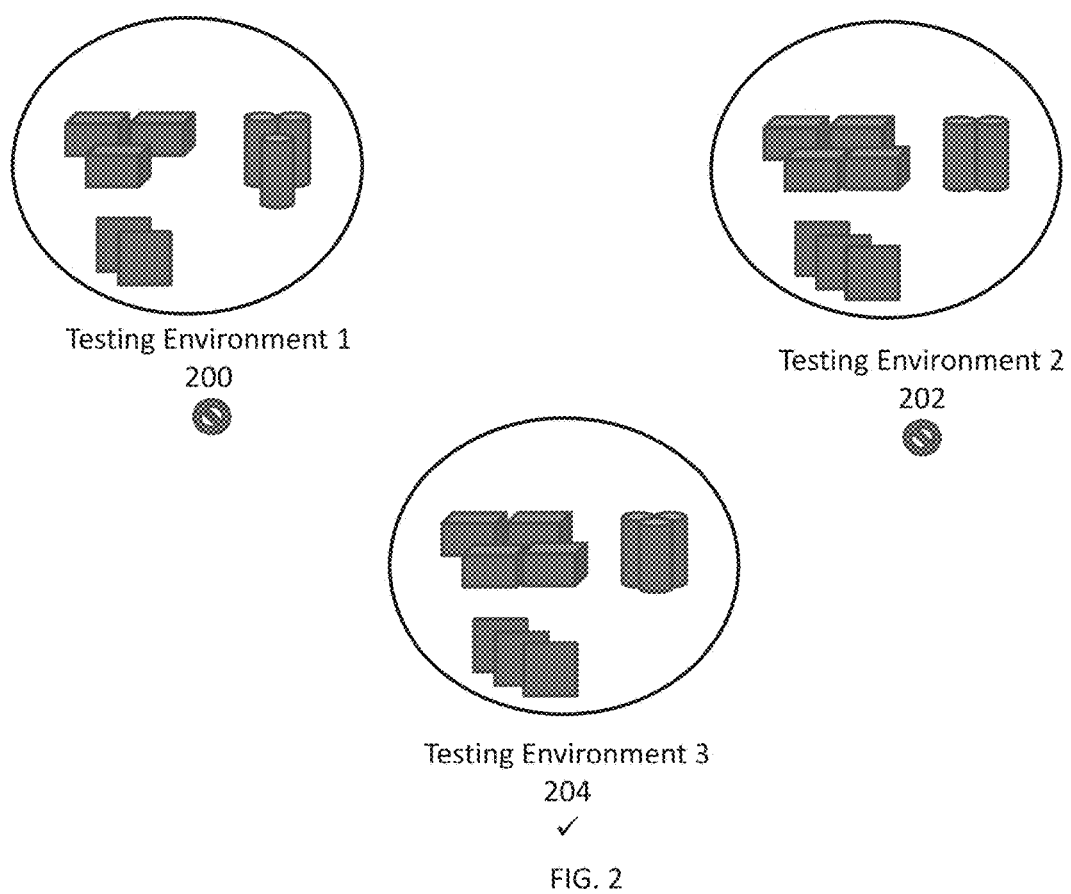
FIG. 2 illustrates example test environments according to an embodiment.

FIG. 2 illustrates an example configuration for a test environment. With reference to FIGS. 1 and 2 concurrently and in a non-limiting example, the testing engine 100 may receive a request to execute a performance test of an application using the configuration of testing environment 200. The request may include the specified configuration of testing environment 200, test data, and a desired performance requirement. Testing environment 200 may include two servers, a computing cluster of three computing devices, and two data repositories. Configuration loader 102 may retrieve the testing environment 200 from the configuration repository 116. The configuration repository may include component name, location, network address, descriptions, attributes, size, type, and/or the like. Data engine 104 may retrieve the specified test data from test data repository 118. Data engine 104 may also retrieve the test script for executing the performance test.

Environment engine 106 sets up test environment 200 according to the specified configuration to include two servers, a computing cluster of three computing devices, and two data repositories. Performance engine 108 then executes the test script in the testing environment 200 using the test data. For example, performance engine 108 runs a series of API calls to an application running in testing environment 200. The API calls have, as input, the test date. In this way, performance engine 108 may execute the two servers, computing cluster of three computing devices, and two data repositories as governed by the test script.

While performance engine 108 executes the test script, monitoring engine 110 monitor the included two servers, a computing cluster of three computing devices, and two data repositories. Monitoring engine 110 collects data regarding the included two servers, a computing cluster of three computing devices, and two data repositories. For example, monitoring engine 110 may collect and record the time that the application needed to respond to each API call in the test script. Monitoring engine 110 may feed the collected data to intelligent configuration generator 114.

Once monitoring engine 110 collects the results, results engine 112 analyzes the results of the executing the test script to generate a score. Results engine 112 may generate a score indicating whether the performance test of the application met the desired performance requirement based on the result of the test script's execution. As an example, each test case of the test script may be assigned a 1 in the event the test case was successfully executed failed and a 0 in the event the test case was not successfully executed. A test case may be executed successfully, if the software application achieves the desired result based on the test case's instructions. The desired result may indicate a desired returned value, execution time, memory utilization, CPU utilization, and/or the like. The score may be generated by taking the average of values of each executed test case. Results engine 112 provides the score to intelligent configuration generator 114.

Based on the score generated by results engine 112 and data collected by monitoring engine 110, intelligent configuration generator 114 determine whether the performance test of the application can be further optimized. Optimization may include updating the configuration of the test environment 200. Intelligent configuration generator 114 may determine the performance requirement for the application was not met based on the score, result of the performance test, and/or data collected by monitoring engine 110 and further computing power is necessary to optimize the performance test of the application. For example, intelligent configuration generator 114 determines the score is less than a threshold amount such as 1. In this regard, intelligent configuration generator 114 may update the configuration to test environment 202 to increase the score. Intelligent configuration generator 114 may use the hill climbing algorithm to incrementally add computing resources. In this example, intelligent configuration generator 114 may increase the computing resources to three servers, and a computing cluster of four computing devices. Test environment 202 may include three servers, a computing cluster of four computing devices, and two data repositories.

Intelligent configuration generator 114 may instruct data engine to modify and/or retrieve different test data from the test data repository 118. Intelligent configuration generator 114 may instruct environment engine 106 to set-up the test environment based on the test environment 202. Intelligent configuration generator 114 may instruct performance engine 108 to re-execute the performance test in test environment 202.

Performance engine 108 may re-execute the test script in test environment 202. Performance engine 108 may execute the three servers, a computing cluster of four computing devices, and two data repositories as governed by the test script. Monitoring engine 110 may monitor the included three servers, a computing cluster of four computing devices, and two data repositories as the test script is executed. Monitoring engine 110 may collect data regarding the included three servers, a computing cluster of four computing devices, and two data repositories. Monitoring engine 110 may feed the collected data to intelligent configuration generator 114.

Results engine 112 may analyze a result of the executing the test script in test environment 202. Results engine 112 may generate a score indicating whether the performance test of the application met a performance requirement based on the result of executing the test script. Results engine 112 may provide the score to intelligent configuration generator 114.

Intelligent configuration generator 114 may determine whether the performance test of the application can be further optimized based on the score generated by results engine 112 and data collected by monitoring engine 110. Intelligent configuration generator 114 may determine the performance requirement for the application was not met based on the score, result of the performance test, and/or data collected by monitoring engine 110 and further access to data repositories is necessary to optimize the performance test of the application. For example, intelligent configuration generator 114 determines the score is still less than a threshold amount of 1. In this regard, intelligent configuration generator 114 may update the configuration to test environment 202 to increase the score. Intelligent configuration generator 114 may use the hill climbing algorithm to incrementally add computing resources. In this example, intelligent configuration generator 114 may increase the computing resources to three servers, a computing cluster of four computing devices, and three data repositories. Test environment 204 may include three servers, a computing cluster of four computing devices, and three data repositories.

Performance engine 108 may re-execute the test script in test environment 204. Performance engine 108 may execute the three servers, a computing cluster of four computing devices, and three data repositories as governed by the test script. Monitoring engine 110 may monitor the included three servers, a computing cluster of four computing devices, and three data repositories as the test script is executed. Monitoring engine 110 may collect data regarding the included three servers, a computing cluster of four computing devices, and three data repositories. Monitoring engine 110 may feed the collected data to intelligent configuration generator 114.

Results engine 112 may analyze a result of the test script's execution in test environment 202. Results engine 112 may generate a score indicating whether the performance test of the application met a performance requirement based on the result of executing the test script. Results engine 112 may provide the score to intelligent configuration generator 114.

Intelligent configuration generator 114 may determine whether the performance test of the application can be further optimized based on the score generated by results engine 112 and data collected by monitoring engine 110. Intelligent configuration generator 114 may determine the performance test of the application is full optimized in test environment 204 based on the result of the performance test and/or the data collected by monitoring engine meeting the performance requirement. For example, intelligent configuration generator 114 may determine the performance test of the application is fully optimized based on the score being the threshold amount of 1.

Figure 3:
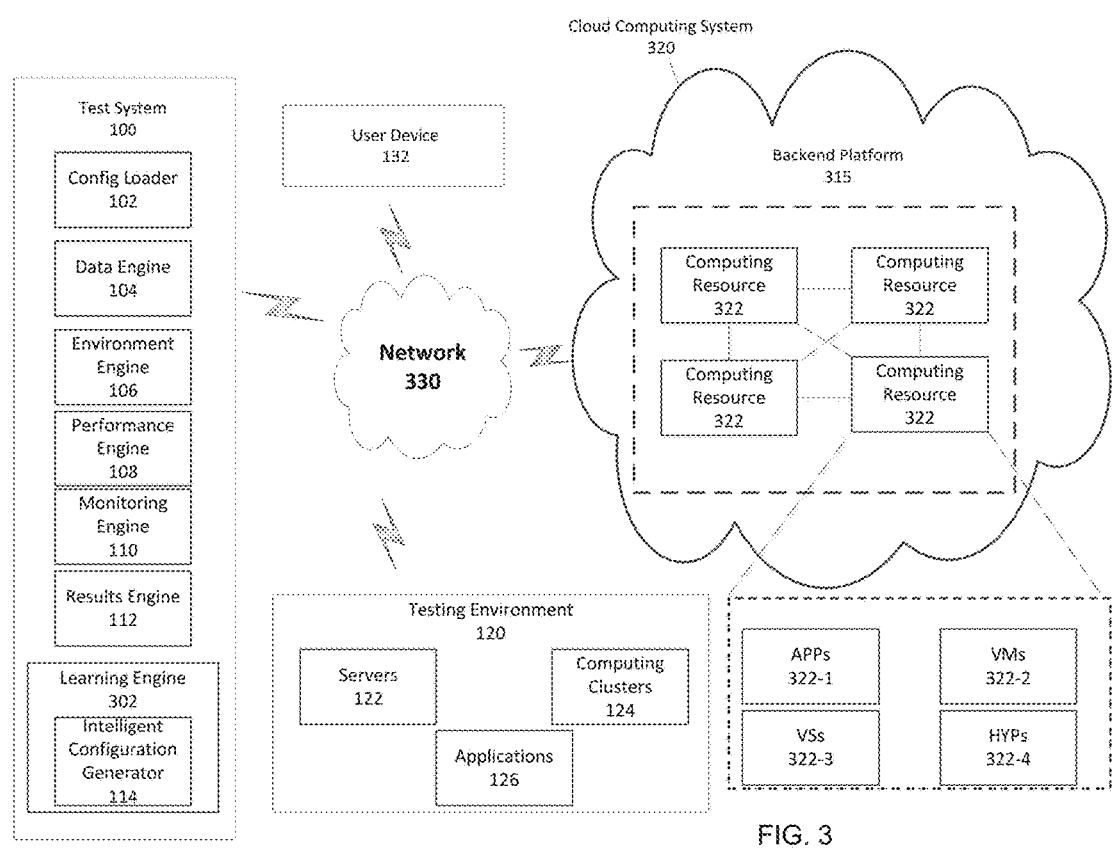
FIG. 3 is a block diagram of an example environment in which systems and/or methods for automatically detecting invalid events may be implemented.

FIG. 3 is a block diagram of an example environment 300 in which systems and/or methods described herein may be implemented. The environment 300 may include sub-systems 102-106, a learning engine 300, a backend platform 315, a cloud computing environment 320, and a network 330. Learning engine 300 may implement the intelligent rule generator 110. Sub-systems 102-106 may include rules engines 206-210, respectively. The devices of the environment 300 may be connected through wired connections, wireless connections, or a combination of wired and wireless connections.

In an example embodiment, one or more portions of the network 330 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The user device 140 may include a communication and/or computing device, such as a desktop computer, mobile device, smartphone, tablet, subnotebook, laptop, personal digital assistant (PDA), gaming device, device integrated with a vehicle, a wearable communication device (i.e., a smart wristwatch, smart eyeglasses, etc. . . . ) and/or any other suitable computing device. The user device 140 may execute an application 142 which is configured to communicate with the cloud computing environment 320.

The backend platform 315 may include a server or a group of servers. In an embodiment, the backend platform 315 may be hosted in a cloud computing environment 320. It may be appreciated that the backend platform 315 may not be cloud-based, or may be partially cloud-based.

The cloud computing environment 320 includes an environment that delivers computing as a service, whereby shared resources, services, etc. may be provided to testing system 100, testing environment 120, and user device 132. The cloud computing environment 320 may provide computation, software, data access, storage, and/or other services that do not require end-user knowledge of a physical location and configuration of a system and/or a device that delivers the services. The cloud computing system 320 may include computer resources 322.

Each computing resource 322 includes one or more personal computers, workstations, computers, server devices, or other types of computation and/or communication devices. The computing resource(s) 322 may host the backend platform 315. The cloud resources may include compute instances executing in the cloud computing resources 322. The cloud computing resources 322 may communicate with other cloud computing resources 322 via wired connections, wireless connections, or a combination of wired or wireless connections.

Computing resources 322 may include a group of cloud resources, such as one or more applications ("APPs") 322-1, one or more virtual machines ("VMs") 322-2, virtualized storage ("VS") 322-3, and one or more hypervisors ("HYPs") 322-4.

Application 322-1 may include one or more software applications that may be provided to or accessed by the user device 140. In an embodiment, the application 204 may execute locally on the user device 140. Alternatively, the application 322-1 may eliminate a need to install and execute software applications on the user device 140. The application 322-1 may include software associated with backend platform 315 and/or any other software configured to be provided across the cloud computing environment 320.

The application 322-1 may send/receive information from one or more other applications 322-1, via the virtual machine 322-2.

Virtual machine 322-2 may include a software implementation of a machine (e.g., a computer) that executes programs like a physical machine. Virtual machine 322-2 may be either a system virtual machine or a process virtual machine, depending upon the use and degree of correspondence to any real machine by virtual machine 322-2. A system virtual machine may provide a complete system platform that supports execution of a complete operating system (OS). A process virtual machine may execute a single program and may support a single process. The virtual machine 322-2 may execute on behalf of a user (e.g., user device 140) and/or on behalf of one or more other backend platforms 315, and may manage infrastructure of cloud computing environment 320, such as data management, synchronization, or long duration data transfers.

Virtualized storage 322-3 may include one or more storage systems and/or one or more devices that use virtualization techniques within the storage systems or devices of computing resource 322. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 322-4 may provide hardware virtualization techniques that allow multiple operations systems (e.g., "guest operating systems") to execute concurrently on a host computer, such as computing resource 322. Hypervisor 322-4 may present a virtual operating platform to the guest operating systems, and may manage the execution of the guest operating systems multiple instances of a variety of operating systems and may share virtualized hardware resource.

As described with respect to FIG. 1, testing system 100 may include configuration loader 102, data engine 104, environment engine 106, performance engine 108, monitoring engine 110, results engine 112, and intelligent rule generator 114. Intelligent rule generator 114 may reside in a learning engine 302. Cloud computing environment 320 may host testing system 100 and all of its components. Testing environment 120 may also be hosted by cloud computing environment 320. Alternatively, testing system 100 and testing environment 120 may reside outside of cloud computing system 320. Alternatively, a portion of sub-systems testing system 100 and testing environment 120 while the remainder portion of testing system 100 and testing environment 120.

Figure 4:
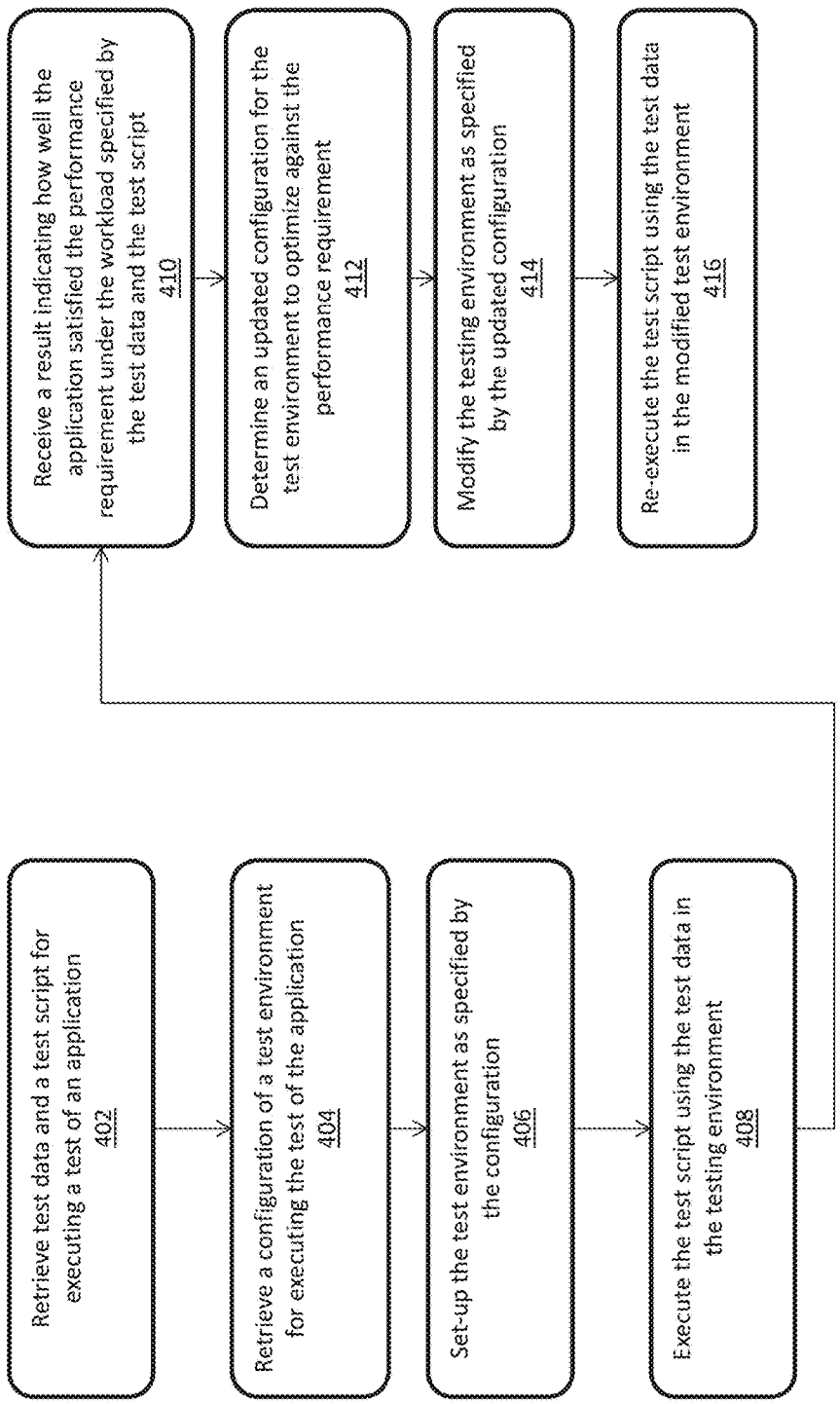
FIG. 4 is a flowchart illustrating a process for automatically reconfiguring a test environment according to an embodiment.

FIG. 4 is a flowchart 400 illustrating a method for automatically reconfiguring a test environment according to an embodiment.

Flowchart 400 starts at operation 402. In operation 402, a data engine may retrieve test data and a test script for executing a test of an application to determine whether the application satisfies a performance requirement under a workload specified by the test data and the test script. Performance tests may monitor whether an application is meeting specified performance requirements. The performance requirements may be related to concurrency and throughput, server response time, render response time, performance specifications, and/or the like.

In operation 404, a configuration loader may retrieve a configuration of a test environment for executing the test of the application. The configuration may include a computing system with multiple components. The components may be servers, computing devices, processors, data repositories, and/or the like. The configuration loader may retrieve the configuration from a configuration repository.

In operation 406, an environment engine may set up as specified by the configuration, the test environment. The test environment may include a computing system and a specified set of components as defined by the configuration.

In operation 408, a performance engine may execute the test script using the test data in the testing environment. The performance engine may deploy applications, spin-up servers, and access data repositories as governed by the test script and test data.

In operation 410, a monitoring engine may receive a result indicating how well the application satisfied the performance requirement under the workload specified by the test data and the test script.

In operation 412, based on the result a learning engine may determine an updated configuration for the test environment to optimize against the performance requirement. The updated configuration may include a different set of components and the computing system. The learning engine may use machine learning algorithms, such as hill climbing, to determine the updated configuration.

In operation 414, the environment engine may modify the testing environment as specified by the updated configuration.

In operation 416, the performance engine may re-execute the test script using the test data in the modified test environment. The learning engine is continuously, using the result, trained to determine whether the performance requirement of the performance test is satisfied. The learning engine may also be trained to determine whether the performance requirement of the performance test is satisfied using past configurations, past performance test results, information regarding the execution of the servers, computing device, and applications, and/or the like.

Figure 5:
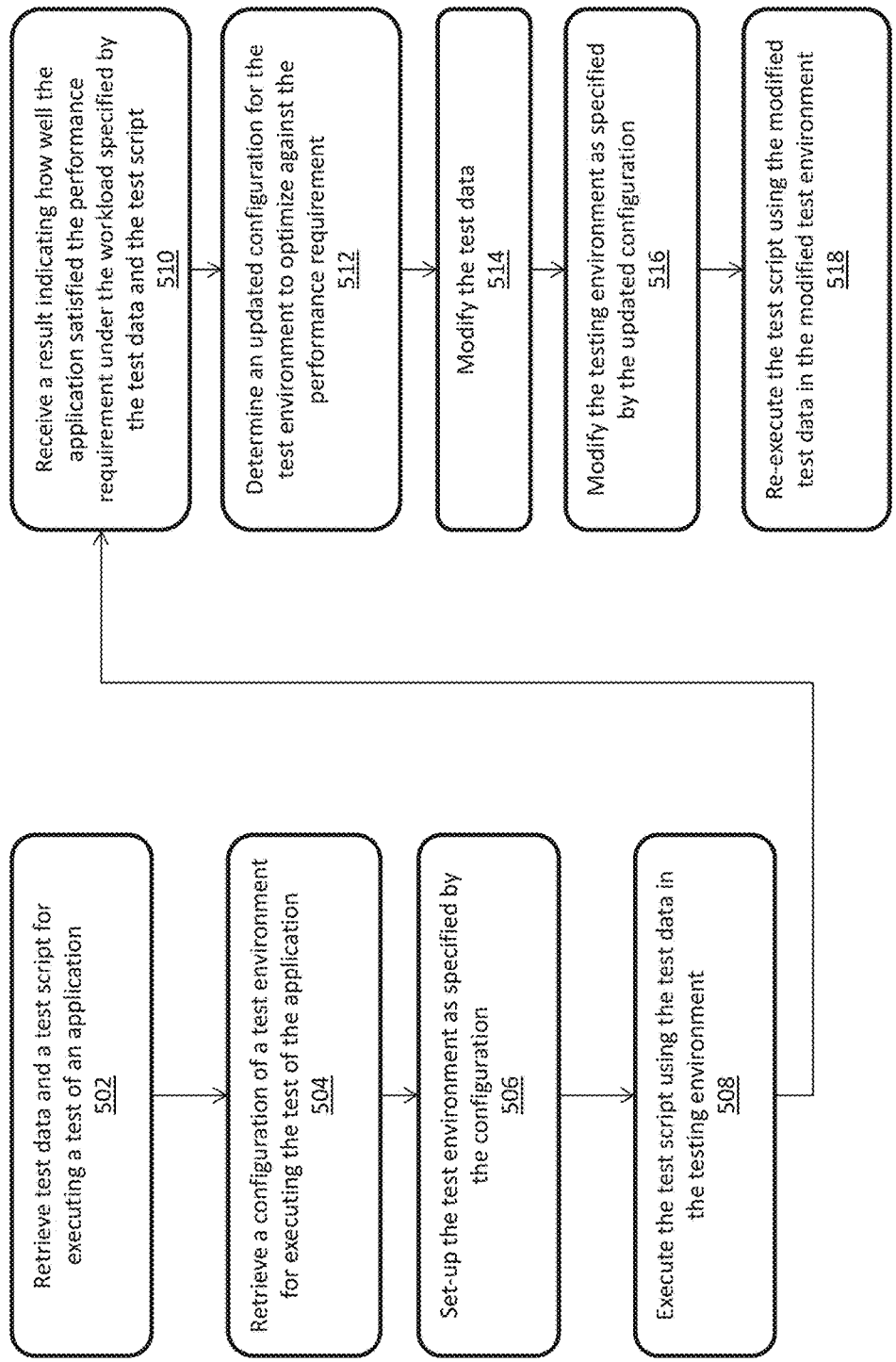
FIG. 5 is a flowchart illustrating a process for automatically reconfiguring a test environment and test data according to an embodiment.

FIG. 5 is a flowchart 500 illustrating a process for automatically reconfiguring a test environment and test data according to an embodiment.

Flowchart 500 starts at operation 502. In operation 502, a data engine may retrieve test data and a test script for executing a test of an application to determine whether the application satisfies a performance requirement under a workload specified by the test data and the test script.

In operation 504, a configuration loader may retrieve a configuration of a test environment for executing the test of the application. The configuration may include a computing system with multiple components. The components may be servers, computing devices, processors, data repositories, and/or the like.

In operation 506, an environment engine may set up as specified by the configuration, the test environment. The test environment may include a computing system and a specified set of components as defined by the configuration.

In operation 508, a performance engine may execute the test script using the test data in the testing environment. The performance engine may deploy applications, spin-up servers, and access data repositories as governed by the test script and test data.

In operation 510, a monitoring engine may receive a result indicating how well the application satisfied the performance requirement under the workload specified by the test data and the test script.

In operation 512, based on the result a learning engine may determine an updated configuration for the test environment to optimize against the performance requirement. The updated configuration may include a different set of components and the computing system.

In operation 514, the learning engine may modify the test data based on the learning engine determining the test data used in the performance test is invalid and modified test data is to be used re-executing the test script in the test environment in the updated configuration. The learning engine may be trained to identify invalid test data and modify the test data for the performance test using reinforcement training, based on successful or unsuccessful results of the performance tests and feedback provided by a user device.

In operation 516, the environment engine may modify the testing environment as specified by the updated configuration.

In operation 516, the performance engine may re-execute the test script using the modified test data in the modified test environment. The learning engine is continuously, using the result, trained to determine whether the performance test is satisfied.

Figure 6:
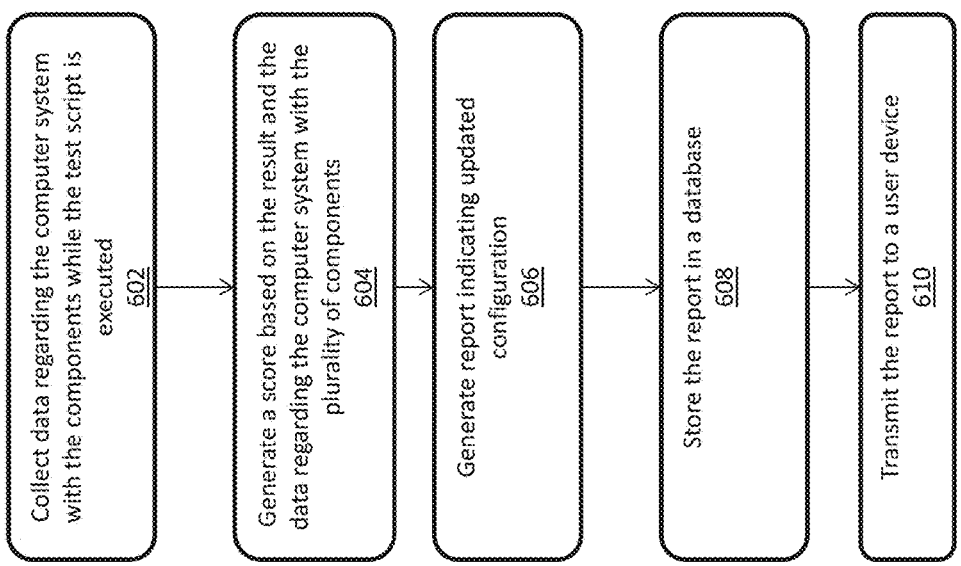
FIG. 6 is a flowchart illustrating a process for generating a report indicating an updated configuration according to an embodiment.

FIG. 6 is a flowchart 600 illustrating a process of generating a report indicating the updated configuration of a test environment according to an embodiment.

Flowchart 600 starts with operation 602. In operation 602, a monitoring engine may collect data regarding a combination of computing clusters, servers, and applications as the test script is executed. The data may be CPU utilization, memory utilization, disk utilization, network utilization, and/or the like.

In operation 604, a results engine may generate a score based on the result and the data regarding the combination of computing clusters, servers, and applications. The learning engine may update the configuration in response to the score being less than a threshold amount. The score may be indicative of the performance requirement under the workload specified by the test data and the test script In operation 606, the results engine may generate a report indicating the updated configuration of the test environment. The report may also include a recommendation indicating the optimal configuration to execute the application based on the performance test. The report may also include data analytics regarding the amount of tests executed, results of each iteration of the test, the different configurations used while executing each iteration of the test, and/or the like.

In operation 608, the results engine may store the report in a database.

In operation 610, the results engine may transmit the report to a user device. The report may be rendered on a dashboard on the user device.

Figure 7:
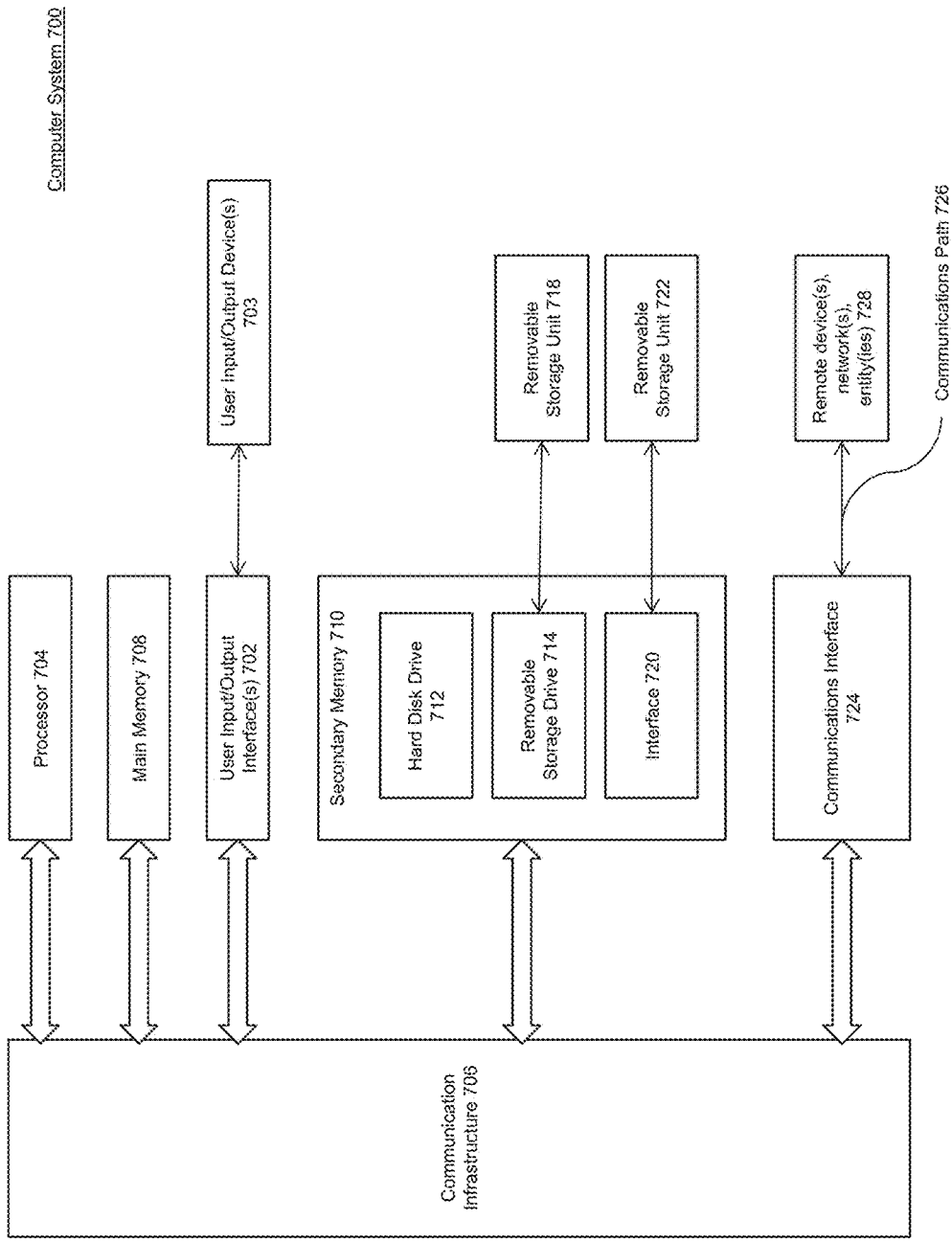
FIG. 7 is a block diagram of example components of device according to an embodiment.

FIG. 7 is a block diagram of example components of device 700. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 706.

Computer system 700 may also include user input/output device(s) 703, such as monitors, keyboards, pointing devices, etc., which may communicate with communication infrastructure 706 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714.

Removable storage drive 714 may interact with a removable storage unit 718. Removable storage unit 718 may include a computer usable or readable storage device having stored thereon computer software (control logic) and/or data. Removable storage unit 718 may be program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible, non-transitory articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for automatically reconfiguring a test environment, the method comprising:
   retrieving test data and a test script for executing a test of an application to determine whether the application satisfies a performance requirement under a workload specified by the test data and the test script;
   retrieving a configuration of a test environment for executing the test of the application;
   setting-up the test environment as specified by the configuration, the test environment comprising a computer system with a plurality of components specified by the configuration;
   executing the test script using the test data in the test environment;
   receiving a result indicating how well the application satisfied the performance requirement under the workload specified by the test data and the test script;
   based on the result, determining, by a learning engine, an updated configuration for the test environment to optimize against the performance requirement;
   modifying the testing environment as specified by the updated configuration; and
   re-executing the test script using the test data in the modified test environment.

2. The method of claim 1, wherein the computer system with the plurality of components includes a combination of computing clusters, servers, and applications.

3. The method of claim 2, further comprising collecting data regarding the combination of computing clusters, servers, and applications as the test script is executed.

4. The method of claim 3, further comprising generating a score based on the result and the data regarding the combination of computing clusters, servers, and applications.

5. The method of claim 4, wherein the learning engine updates the configuration based on the score being lower than a threshold amount.

6. The method of claim 5, wherein the threshold amount indicates the performance requirement is satisfied.

7. The method of claim 1, further comprising generating a report indicating the updated configuration.

8. The method of claim 7, further comprising:
   storing the report in a database; and
   transmitting the report to a user device.

9. The method of claim 1, further comprising prior to re-executing the test script using the test data in the modified test environment, modifying the test data.

10. The method of claim 9, wherein modifying the test data further comprises:
    determining the test data used while executing the test scripts is invalid, based on the result;
    determining valid test data for executing the test scripts; and
    modifying the invalid test data to the valid test data.

11. A system for automatically reconfiguring a test environment, the system comprising:
    a memory;
    a processor in communication with the memory, configured to:
       retrieve test data and a test script for executing a test of an application to determine whether the application satisfies a performance requirement under a workload specified by the test data and the test script;
       retrieve a configuration of a test environment for executing the test of the application;
       set-up the test environment as specified by the configuration, the test environment comprising a computer system with a plurality of components specified by the configuration;
       execute the test script using the test data in the test environment;
       receive a result indicating how well the application satisfied the performance requirement under the workload specified by the test data and the test script;
       based on the result, determine, by a learning engine, an updated configuration for the test environment to optimize against the performance requirement;
       based on the result, modify, by the learning engine, the test data;
       modify the testing environment as specified by the updated configuration; and
       re-execute the test script using the modified test data in the modified test environment.

12. The system of claim 11, wherein the computer system with the plurality of components include a combination of computing clusters, servers, and applications.

13. The system of claim 12, wherein the processor is further configured to collect data regarding the combination of computing clusters, servers, and applications as the test script is executed.

14. The system of claim 13, wherein the processor is further configured to generate a score based on the result and the data regarding the combination of computing clusters, servers, and applications.

15. The system of claim 14, wherein the learning engine updates the configuration based on the score being lower than a threshold amount.

16. The system of claim 15, wherein the threshold amount indicates the performance requirement is satisfied.

17. The system of claim 16, wherein the processor is further configured to generate a report indicating the updated configuration.

18. The method of claim 17, wherein the processor is further configured to:
    store the report in a database; and
    transmit the report to a user device.

19. A non-transitory computer readable medium storing instructions that when executed by one or more processors of a device cause the one or more processors to:
    retrieve test data and a test script for executing a test of an application to determine whether the application satisfies a performance requirement under a workload specified by the test data and the test script;
    retrieve a configuration of a test environment for executing the test of the application;

set-up the test environment as specified by the configuration, the test environment comprising a computer system with a plurality of components specified by the configuration;

execute the test script using the test data in the test environment;

collect data regarding the computer system with the plurality of components while the test script is executed;

receive a result indicating how well the application satisfied the performance requirement under the workload specified by the test data and the test script;

based on the result and the data regarding the computer system with the plurality of components, determine, by a learning engine, an updated configuration for the test environment to optimize against the performance requirement;

modify the testing environment as specified by the updated configuration; and re-execute the test scripts using the test data in the modified test environment.

20. The medium of claim 19, wherein the computer system with the plurality of components include a combination of computing clusters, servers, and applications.

* * * * *